United States Patent
Virnich et al.

(10) Patent No.: US 9,132,850 B2
(45) Date of Patent: Sep. 15, 2015

(54) CAPACITIVE SENSING SYSTEM CONFIGURED FOR USING HEATING ELEMENT AS ANTENNA ELECTRODE

(71) Applicant: IEE International Electronics & Engineering S.A., Echternach (LU)

(72) Inventors: Michael Virnich, Korlingen (DE); David Hoyer, Ayl (DE); Martin Thinnes, Trierweiler (DE); Michael Puetz, Trier (DE); Thomas Meyers, Bitburg (DE); Laurent Lamesch, Reichlange (LU)

(73) Assignee: IEE INTERNATIONAL ELECTRONICS & ENGINEERING S.A., Luxembourg (LU)

( * ) Notice: Subject to any disclaimer, the term of this patent is extended or adjusted under 35 U.S.C. 154(b) by 280 days.

(21) Appl. No.: 13/623,217

(22) Filed: Sep. 20, 2012

(65) Prior Publication Data
US 2013/0098890 A1    Apr. 25, 2013

(30) Foreign Application Priority Data
Sep. 21, 2011   (LU) .......................................... 91879

(51) Int. Cl.
*B60L 1/02*     (2006.01)
*G01R 27/26*    (2006.01)
(Continued)

(52) U.S. Cl.
CPC ................ *B62D 1/065* (2013.01); *B60N 2/002* (2013.01); *B60N 2/5685* (2013.01); *B60R 21/0154* (2014.10); *B60R 21/01532* (2014.10); *B62D 1/046* (2013.01)

(58) Field of Classification Search
CPC ............... B60R 21/015–21/01566; B60N 2/00
USPC ................... 219/202–204, 217; 324/658, 686
See application file for complete search history.

(56) References Cited

U.S. PATENT DOCUMENTS 3,705,365 A    12/1972   Szabo et al.
4,104,715 A     8/1978   Lawson, Jr.
(Continued)

FOREIGN PATENT DOCUMENTS

DE    102009055424 A1    7/2011
EP       1553699 A1      7/2005
(Continued)

OTHER PUBLICATIONS

Luxembourg Search Report and Written Opinion; Luxembourg Application No. 91879: Dated May 3, 2012.
(Continued)

*Primary Examiner* — Sang Y Paik
(74) *Attorney, Agent, or Firm* — Cantor Colburn LLP

(57) ABSTRACT

A capacitive sensing system for a heating element comprises a capacitive detector connectable to the heating element and a common mode choke for connecting the heating element with a heating current supply. The detector drives an alternating current into the heating element and produces an output depending on the capacitive load, which the alternating current is subject to. Depending on the object sensed, the load varies in a range between a minimum and a maximum value. The choke represents an inductive load in parallel of the capacitive load. The capacitive load and the inductive load contribute to a complex impedance dominated by the inductive load. A compensation capacitor arranged parallel to the choke represents an additional capacitive load also contributing to the complex impedance. The compensation capacitor is dimensioned such that the sum of additional capacitive load and maximum value amounts to at least 50% of the inductive load.

14 Claims, 3 Drawing Sheets

(51) Int. Cl.
    *B62D 1/06*      (2006.01)
    *B60N 2/56*      (2006.01)
    *B62D 1/04*      (2006.01)
    *B60N 2/00*      (2006.01)
    *B60R 21/015*      (2006.01)

(56) References Cited

U.S. PATENT DOCUMENTS

| | | |
|---|---|---|
| 4,363,008 A | 12/1982 | Chambers, Jr. |
| 6,161,070 A | 12/2000 | Jinno et al. |
| 6,392,542 B1 | 5/2002 | Stanley |
| 6,661,115 B2 | 12/2003 | Lester |
| 6,703,845 B2 | 3/2004 | Stanley et al. |
| 7,521,940 B2 | 4/2009 | Koch et al. |
| 8,373,952 B2 | 2/2013 | Mirafzal et al. |
| 2008/0186282 A1 | 8/2008 | Nix et al. |
| 2009/0295199 A1 | 12/2009 | Kincaid et al. |
| 2009/0295411 A1 | 12/2009 | Hansen |
| 2010/0038351 A1 | 2/2010 | Tabaczynski |
| 2011/0121618 A1 | 5/2011 | Fischer et al. |
| 2011/0148648 A1 | 6/2011 | Fischer et al. |
| 2012/0234816 A1 | 9/2012 | Petrenko et al. |
| 2013/0027065 A1 | 1/2013 | Stanley et al. |

FOREIGN PATENT DOCUMENTS

| | | |
|---|---|---|
| EP | 2036764 A1 | 3/2009 |
| EP | 2090460 A1 | 8/2009 |
| JP | 10325136 A | 12/1998 |
| WO | 9217344 A1 | 10/1992 |
| WO | 9513204 A1 | 5/1995 |
| WO | 2008095939 A1 | 8/2008 |

OTHER PUBLICATIONS

Joshua Smith, "Electric Field Sensing for Graphical Interfaces" IEEE Computer Graphics and Applications, published in Computer Graphics I/O Devices, Issue May/Jun. 1998, pp. 54-60.

International Search Report; International Application No. PCT/EP2011/054343; International Application Filing Date Mar. 22, 2011; Mail Date Jun. 1, 2011.

Written Opinion International International Application No. PCT/EP2011/054343; International Application Filing Date Mar. 22, 2011; Mail Date Jun. 1, 2011.

International Search Report; International Application No. PCT/EP2011/054346; International Application Filing Date Mar. 22, 2011; Mail Date May 24, 2011.

Luxembourg Search Report; Luxembourg Application No. LU91872; Dated May 2, 2012.

Written Opinion; International Application No. PCT/EP2011/054346; International Application Filing Date Mar. 22, 2011; Mail Date May 24, 2011.

CAPACITIVE SENSING SYSTEM CONFIGURED FOR USING HEATING ELEMENT AS ANTENNA ELECTRODE

TECHNICAL FIELD

The present invention generally relates to a capacitive sensing system that can use a heating element as its antenna electrode. A capacitive sensing system as proposed herein may e.g. be used for detecting the absence or presence of an occupant on an occupiable item, which might be a vehicle seat, a hospital bed etc., or for detecting a driver's hand on the steering wheel.

BACKGROUND ART

A capacitive sensor, called by some electric field sensor or proximity sensor, designates a sensor, which generates a signal responsive to the influence of what is being sensed (a person, a part of a person's body, a pet, an object, etc.) upon an electric field. A capacitive sensor generally comprises at least one antenna electrode, to which is applied an oscillating electric signal and which thereupon emits an electric field into a region of space proximate to the antenna electrode, while the sensor is operating. The sensor comprises at least one sensing electrode at which the influence of an object or living being on the electric field is detected. In some (so-called "loading mode") capacitive occupancy sensors, the one or more antenna electrodes serve at the same time as sensing electrodes. In this case, the measurement circuit determines the current flowing into the one or more antenna electrodes in response to an oscillating voltage being applied to them. The relationship of voltage to current yields the complex impedance of the one or more antenna electrodes. In an alternative version of capacitive sensors ("coupling mode" capacitive sensors), the transmitting antenna electrode(s) and the sensing electrode(s) are separate from one another. In this case, the measurement circuit determines the current or voltage that is induced in the sensing electrode when the transmitting antenna electrode is operating.

The different capacitive sensing mechanisms are explained in the technical paper entitled "Electric Field Sensing for Graphical Interfaces" by J. R. Smith, published in Computer Graphics I/O Devices, Issue May/June 1998, pp 54-60. The paper describes the concept of electric field sensing as used for making non-contact three-dimensional position measurements, and more particularly for sensing the position of a human hand for purposes of providing three dimensional positional inputs to a computer. Within the general concept of capacitive sensing, the author distinguishes between distinct mechanisms he refers to as "loading mode", "shunt mode", and "transmit mode" which correspond to various possible electric current pathways. In the "loading mode", an oscillating voltage signal is applied to a transmit electrode, which builds up an oscillating electric field to ground. The object to be sensed modifies the capacitance between the transmit electrode and ground. In the "shunt mode", an oscillating voltage signal is applied to the transmit electrode, building up an electric field to a receive electrode, and the displacement current induced at the receive electrode is measured, whereby the displacement current may be modified by the body being sensed. In the "transmit mode", the transmit electrode is put in contact with the user's body, which then becomes a transmitter relative to a receiver, either by direct electrical connection or via capacitive coupling. "Shunt mode" is alternatively referred to as the above-mentioned "coupling mode".

Capacitive occupant sensing systems have been proposed in great variety, e.g. for controlling the deployment of one or more airbags, such as e.g. a driver airbag, a passenger airbag and/or a side airbag. U.S. Pat. No. 6,161,070, to Jinno et al., relates to a passenger detection system including a single antenna electrode mounted on a surface of a passenger seat in an automobile. An oscillator applies on oscillating voltage signal to the antenna electrode, whereby a minute electric field is produced around the antenna electrode. Jinno proposes detecting the presence or absence of a passenger in the seat based on the amplitude and the phase of the current flowing to the antenna electrode. U.S. Pat. No. 6,392,542, to Stanley, teaches an electric field sensor comprising an electrode mountable within a seat and operatively coupled to a sensing circuit, which applies to the electrode an oscillating or pulsed signal "at most weakly responsive" to wetness of the seat. Stanley proposes to measure phase and amplitude of the current flowing to the electrode to detect an occupied or an empty seat and to compensate for seat wetness.

The idea of using the heating element of a seat heater as an antenna electrode of a capacitive occupancy sensing system has been known for a long time. WO 92/17344 A1 discloses a an electrically heated vehicle seat with a conductor, which can be heated by the passage of electrical current, located in the seating surface, wherein the conductor also forms one electrode of a two-electrode seat occupancy sensor.

WO 95/13204 discloses a similar system, in which the oscillation frequency of an oscillator connected to the heating element is measured to derive the occupancy state of the vehicle seat.

U.S. Pat. No. 7,521,940 relates to a combined seat heater and capacitive sensor capable of operating, at a time, either in heating mode or in occupant-sensing mode. The device includes a sensor/heat pad for transmitting a sensing signal, a first diode coupled to a first node of the sensor/heat pad, a second diode coupled to a second node of the sensor/heat pad, a first transistor coupled to the first diode and a second transistor coupled to the second diode. During sensing mode, the first and second transistors are opened and the nodes between the first transistor and the first diode, as well as between the second transistor and the second diode are reverse-biased to isolate the sensor/heat pad from the power supply of the heating circuit.

US 2009/0295199 discloses a combined seat heater and capacitive sensor, wherein each of the two terminals of the heating element is connected to the heating power supply via two transistors in series. The device may not operate in sensing mode and in heating mode at a time. When the device is in sensing mode, the nodes between each pair of transistors are actively kept at the same potential as the heating element by means of respective voltage followers in order to neutralize any open-switch impedance of the transistors.

The very same idea has already been disclosed in U.S. Pat. No. 6,703,845. As an alternative to transistors, that document discloses inductors to achieve a high impedance at the frequency of the oscillating signal between the heating element and the power source of the heating circuit. As in the previously discussed document, a voltage follower maintains the intermediate nodes substantially at the same potential as the heating element in order to effectively isolate, at the frequency of the oscillating signal, the power supply of the heating circuit from the heating element.

A disadvantage of the system disclosed in U.S. Pat. No. 6,703,845 is that the inductors used as AC-decoupling elements have to support the full heating current (up to 10 A DC and more) and present high AC impedance to the capacitive measurement circuit and the seat heater at the same time.

High inductance and high operating DC current implies that the inductor have to be wound on large cores, which are expensive. Depending on the application chosen from U.S. Pat. No. 6,703,845, either two or four of these inductors have to be used.

US 2011/121618 discloses yet another variant of an occupant detection system including a heating element adjacent the seating surface of a seat. A capacitive occupant detection circuit is electrically coupled to the heating element. A common mode choke is interposed between the heating circuit and the heating element as an isolation circuit that prevents the heating circuit from influencing the occupant detection circuit.

An ideal common mode choke would totally prevent flow of an AC current. In practice, however, an ideal common mode choke does not exist and there will be a residual alternating current across the common mode choke. In order to reduce this residual alternating current to an extent that the isolation circuit can be considered to prevent the heating circuit from influencing the occupant detection circuit, i.e. to an extent that the residual alternating current can be neglected in comparison to the alternating current flowing across the capacitance to be measured, one would have to choose (among the existing common mode chokes) a common mode choke whose resistance to the heating current would result in a considerable loss of heating power in the common mode choke.

BRIEF SUMMARY

A capacitive sensing system is provided configured for using a heating element as its antenna electrode, which is capable of using a non-ideal common mode choke for AC-decoupling the heating element from the heating current supply.

A capacitive sensing system for being connected to a heating element producing heat upon electrical current being caused to flow across the heating element comprises a capacitive detector connectable to the heating element and a common mode choke for connecting the heating element with a heating current supply. The capacitive detector is configured for driving an alternating current into the heating element and for producing an output depending on the capacitive load that the alternating current is subject to between the heating element and a reference node (e.g. circuit ground). Depending on the object (e.g. a seat occupant, etc.) to be sensed, the capacitive load is variable in a range between a minimum value and a maximum value. It is worthwhile noting that the minimum and maximum values do not depend on the object to be sensed but are determined by the geometry of the system, the materials used and the frequency of the alternating current (e.g. selected in the range from about 50 kHz to about 10 GHz, more preferably in the range from about 50 kHz to about 30 MHz). The common mode choke represents an inductive load in parallel of the capacitive load. The capacitive load and the inductive load contribute together to a complex impedance (between the heating element and the reference node). According to the invention, within the complex impedance, the inductive load dominates (i.e. is greater than, e.g. at least 1.2, 1.5 or 2 times greater than) the capacitive load. Furthermore, the capacitive sensing system comprises at least one compensation capacitor arranged in parallel of the common mode choke. The compensation capacitor represents an additional capacitive load also contributing to the complex impedance. The compensation capacitor is dimensioned such that the sum of the additional capacitive load and the maximum value amounts to at least 50%, preferably to at least 75%, more preferably to at least 90% and most preferably to at least 95%, of the inductive load.

As those skilled will note, the capacitance to be sensed, the common mode choke and the compensation capacitor form a parallel resonant network between the heating element and the reference node. The overall complex impedance of that network has a capacitive contribution (the sum of the above-mentioned capacitive load and the additional capacitive load) and an inductive contribution (the above-mentioned inductive load). Due to the dominance of the inductive load compared to the capacitive load, the amplitude variations of the alternating current due to the object being sensed would be small compared to the constant part of the amplitude of the (mainly inductive) alternating current. This is problematic in terms of measurement resolution. The compensation capacitor provides an additional capacitive load, which partially compensates the effects of the inductive load on the alternating current. Consequently, thanks to the compensation capacitor, the amplitude variations of the alternating current may be brought within the same order of magnitude as the amplitude of the alternating current. It is worthwhile noting that the alternating current may be subject to a resistive load in addition to the reactive (capacitive and inductive) load. In the context of the present description, however, any resistive load may be disregarded.

The capacitive sensing system as described above may be configured as a module so as to be easily connectable between to an existing heating element and its heating current supply.

A preferred alternative aspect of the invention concerns a combined (integrated) heating and capacitive sensing system. Such a combined heating and capacitive sensing system, comprises a heating element producing heat upon electrical current being caused to flow across the heating element, a capacitive detector connected to the heating element, configured for driving an alternating current into the heating element and for producing an output depending on a capacitive load on the alternating current between the heating element and a reference node, the capacitive load being variable in a range between a minimum value and a maximum value depending on an object to be sensed, and a common mode choke for connecting the heating element with a heating current supply, the common mode choke representing an inductive load in parallel of the capacitive load, the capacitive load and the inductive load contributing together to a complex impedance. Within the complex impedance, the inductive load dominates the capacitive load. At least one compensation capacitor is arranged in parallel of the common mode choke, the compensation capacitor representing an additional capacitive load also contributing to the complex impedance, the compensation capacitor dimensioned such that the sum of the additional capacitive load and the maximum value amounts to at least 50%, preferably to at least 75%, more preferably to at least 90% and most preferably to at least 95%, of the inductive load.

The combined heating and capacitive sensing system could e.g. be used in a steering wheel and/or a vehicle seat.

The combined heating and capacitive sensing system may be implemented as a combined seat heating and capacitive occupancy sensing system, the output produced by the capacitive detector being in this case indicative of a seat occupancy state.

As will be appreciated, the capacitive load and the inductive load both depend on the frequency of the alternating current. It shall be understood that, in case of a capacitive detector capable of operating at plural (at least two) frequencies, the inductive load need not dominate the capacitive load at all frequencies. In this case, it may be advantageous to provide a switch for activating and deactivating the compensation capacitor: for measurements at a frequency, at which the inductive load dominates the capacitive load, the compensation capacitor may be activated, for measurements at a frequency, at which the inductive load does not dominate the capacitive load, the compensation capacitor may be deactivated. If the inductive load dominates the capacitive load to different extents at the different frequencies, the system preferably comprises a plurality of compensation capacitors for counteracting the different extents of domination at the different frequencies.

BRIEF DESCRIPTION OF THE DRAWINGS

A preferred embodiment of the invention will now be described, by way of example, with reference to the accompanying drawings in which.

DESCRIPTION OF A PREFERRED EMBODIMENT

In the following, it will be assumed that the heating current is direct current (DC) and that the capacitive measurement uses alternating current (AC) at a certain frequency. This is insofar a simplification that transient states (e.g. switching on/or off of the heating current), noise and parasitic currents are not taken into account. It should also be noted that the heating current need not be direct current in the strictest sense: it may be variable, but on a long time-scale, so as not to interfere with the current used for the capacitive measurement. For sake of simplicity, we will use "DC" to designate slowly varying or constant signals. The capacitance measurement network preferably operates at frequency selected in the range from about 50 kHz to about 10 GHz, more preferably in the range from about 50 kHz to about 30 MHz.

Figure 1:
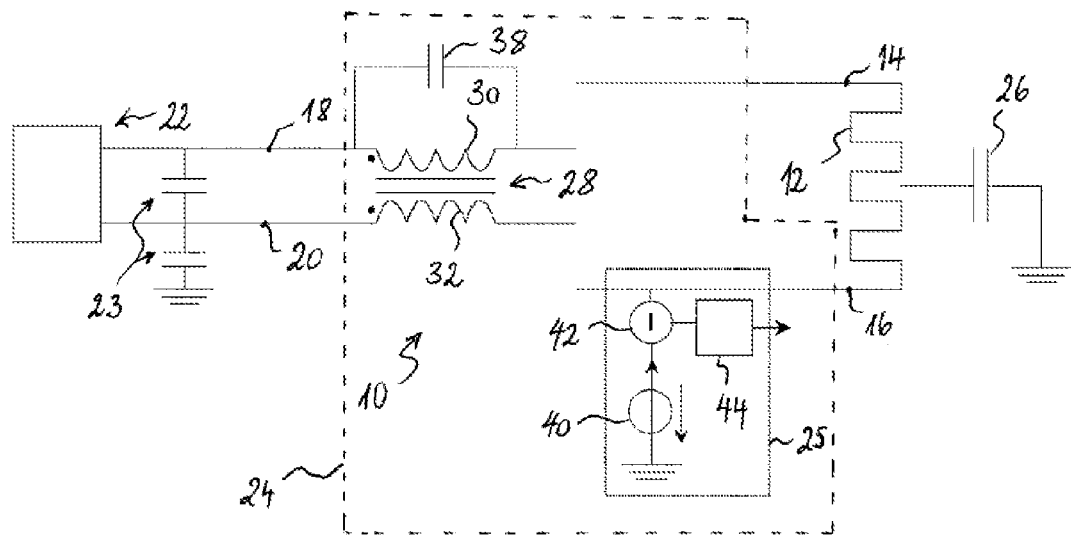
FIG. 1 is a schematic representation of a combined heating and capacitive sensing system.

FIG. 1 shows a combined heating and capacitive sensing system 10 according to a preferred embodiment of the invention. The combined system 10 comprises a heating element 12 that produces heat when electrical current is caused to flow across it. The heating element 12 may comprise a conductive wire, cable, fibre, bundle of fibres or a conductive track (e.g. made of a PTC material) printed on a flexible support. The heating element 12 has a first 14 and a second 16 terminal connected to a first 18 and a second 20 terminal of a heating current supply 22, respectively. The heating current supply 22 (e.g. a direct current source and control electronics) and the heating element 12 form together the heating circuit of a heater, e.g. for a vehicle seat. The terminals of the heating current supply 22 typically have low AC impedance to AC-ground (e.g. due to coupling capacitors 23) in order to avoid that AC signals disturb the heating current supply 22. The heating current supply 22 preferably comprises a user-actuatable master switch (not shown) allowing the user to activate or deactivate the heating circuit as a whole and a temperature controller (not shown; including e.g. a thermostat) that regulates the temperature to a comfortable level. When the heater is operating, the temperature controller opens and closes the heating circuit (low-frequency pulse-width modulation of the heating current) in such a way as to achieve a preset target temperature. Preferably, the target temperature may be selected by the user using a temperature control interface (e.g. a knob, a slider, a wheel or the like).

The combined heating and capacitive sensing system 10 further comprises a capacitive detector 25 connected to the heating element 12. The capacitive detector 25 is configured for using the heating element 12 as its antenna electrode. In particular, during operation, the capacitive detector 25 drives an alternating current into the heating element 12 and produces an output indicative of the capacitance between the heating element 12 and AC-ground based upon the alternating current. In FIG. 1, capacitor 26 symbolically represents the capacitive coupling of the heating element 12 to a grounded electrode (e.g. the vehicle frame in case of a vehicle seat occupancy sensor). The complex impedance 26 between the heating element 12 and AC-ground depends on whether the space between the heating element 12 and the AC-ground is occupied by a conductive body or not. The capacitive detector 25 illustrated in FIG. 1 operates in so-called loading mode. An oscillator 40 (e.g. an NCO) and a current meter 42 are connected in series to the heating element 12. The current meter 42 measures the complex current flowing into the heating element 12. Evaluation circuit 44 is connected to the current meter 42 so as to receive the measurement signals there from and to output a signal indicative of the capacitance between the heating element 12 and AC-ground, e.g. an occupancy status. The capacitive detector 25 is preferably implemented as an ASIC, an FPGA, or the like.

The capacitive detector 25 comprises a common mode choke 28 with a coupling factor close to unity, which presents significant impedance to the alternating current but low resistance to the direct heating current. The common mode choke comprises at least two windings 30, 32 arranged on the same magnetic core (and having the same number of windings). The first winding 30 is connected between the first terminal 14 of the heating element 12 and the first terminal 18 of the heating current supply 22. The second winding 32 is connected between the second terminal 16 of the heating element 12 and the second terminal 20 of the heating current supply 22.

During operation of the capacitive detector, the oscillator 40 applies an alternating voltage, causing an alternating current $I_{IN}$ to flow into the heating element 12. Part of the current flows across capacitor 26 to AC-ground (current $I_X$). Since the common mode choke 28 cannot perfectly block alternating current, another part of the applied current flows to AC-ground via the windings 30 and 32 of the common mode choke 28 (current $I_{choke}=I_1+I_2$, where $I_1$ and $I_2$ designate the alternating current across the first and second winding, respectively). From Kirchhoff's junction rule: $I_{IN}=I_X+I_{choke}$.

Figure 2:
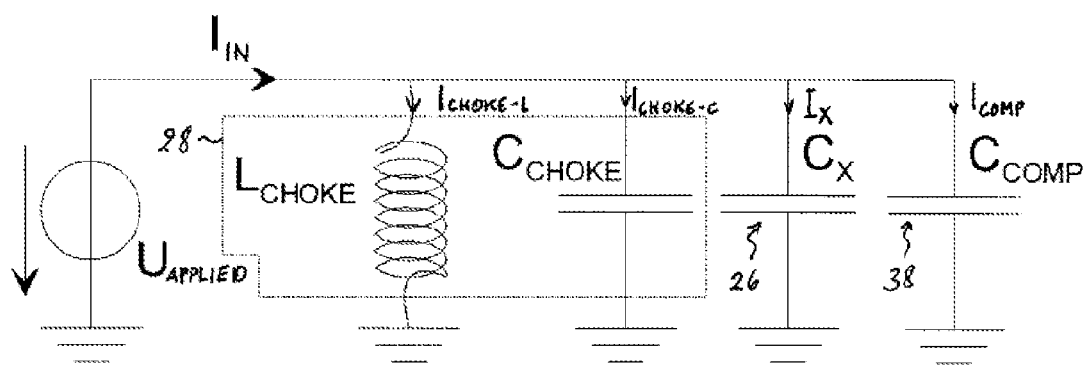
FIG. 2 is an equivalent circuit diagram of the system of FIG. 1.

FIG. 2 is an equivalent circuit diagram of the combined heating and capacitive sensing system of FIG. 1 (where it is supposed that the terminals 18 and 20 are AC-grounded). $L_{CHOKE}$ designates the inductance of the common mode choke 28, $C_{CHOKE}$ the capacitance of the common mode choke 28. $C_X$ is the a priori unknown capacitance to be determined (i.e. of capacitor 26). $C_{COMP}$ is the capacitance of compensation capacitor 38 arranged in parallel of the common mode choke 28. The complex voltage $U_{APPLIED}$ applied by the oscillator 40 and the alternating current $I_{IN}$ across the current meter 42 are related to each other by $I_{IN}(t)=Y \cdot U_{APPLIED}(t)$, where Y designates the complex conductance of the parallel network shown in FIG. 2. $Y=j \cdot (\omega \cdot C_{CHOKE} + \omega \cdot C_X + \omega \cdot C_{COMP} - 1/(\omega \cdot L_{CHOKE}))$, where j is the imaginary unit and ω represents the angular frequency of the applied voltage. It follows from this relationship that the alternating current $I_{CHOKE-L}$ flowing through the inductance $L_{CHOKE}$ has a phase angle of −90° in relation to the oscillator's phase angle. The currents $I_{CHOKE-C}$, $I_X$ and $I_{comp}$ have a phase angle of +90° in relation to the oscillator's phase angle.

Figure 3:
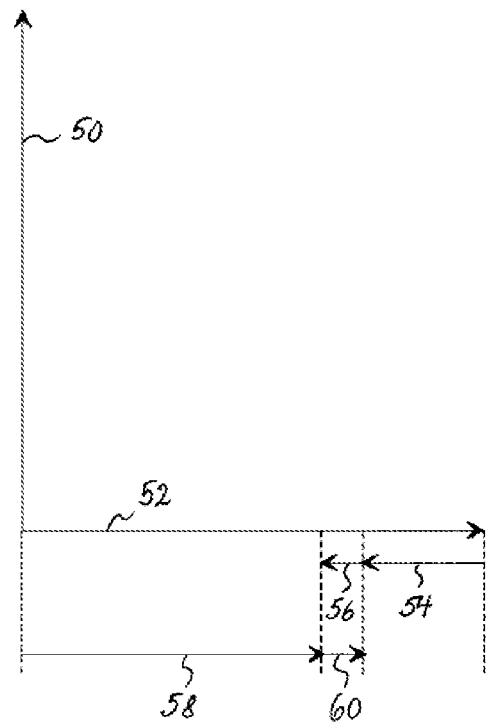
FIG. 3 is a pointer diagram relating to FIG. 2 in case the compensation capacitor is omitted (only the imaginary components of the currents are shown)

FIG. 3 is the pointer diagram that results when the compensation capacitor 38 ($C_{COMP}$) is omitted. Assuming that the inductive load dominates the sum of the capacitive loads $C_X$ and $C_{CHOKE}$, the phase angle of the sum $I_{CHOKE-L} + I_{CHOKE-C} + I_X$ remains −90° (inductive). Pointer 50 is the pointer of $U_{APPLIED}$. Pointer 52 is the pointer of $I_{CHOKE-L}$. Pointer 54 is the pointer of the sum of the capacitive currents $I_{CHOKE-C} + I_X$. Pointer 56 illustrates the possible variations of pointer 54 due to variations in the capacitance to be determined $C_X$ in an interval between a minimum and a maximum value. Pointer 58 is the pointer of the overall resulting current $I_{IN} = I_{CHOKE-L} + I_{CHOKE-C} + I_X$. Pointer 60 illustrates the possible variations of pointer 58 due to variations in the capacitance to be determined $C_X$. The length of pointer 58 (which corresponds to the amplitude of the overall current) is much longer than the length of the pointer of the possible variations 60 (which corresponds to the possible variations of the amplitude of the overall current). This poses a problem for the measurement, since only a small part of the signal measured ($I_N$) carries the useful information. Detecting these variations with an satisfactory resolution may thus be a difficult task in case of a dominating inductive load.

Figure 4:
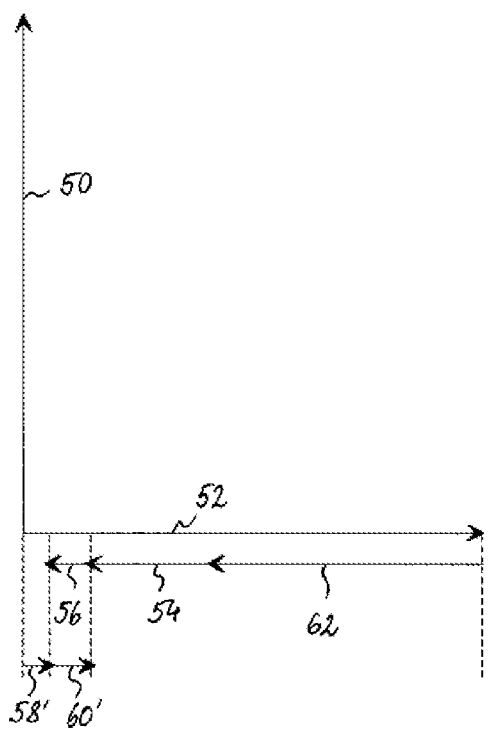
FIG. 4 is a pointer diagram relating to FIG. 2 in case the compensation capacitor is present (only the imaginary components of the currents are shown)

FIG. 4 is the pointer diagram that results when the compensation capacitor 38 ($C_{COMP}$) is present. Assuming again that the inductive load dominates the sum of the capacitive loads $C_X$ and $C_{CHOKE}$, the phase angle of the sum $I_{CHOKE-L} + I_{CHOKE-C} + I_X$ remains −90° (inductive). Pointers 50, 52, 54 and 56 have the same significance as in FIG. 3. Pointer 62 is the pointer of $I_{COMP}$. Pointer 58' is the pointer of the overall resulting current $I_{IN} = I_{CHOKE-L} + I_{CHOKE-C} + I_{COMP} + I_X$. Pointer 60' illustrates the possible variations of pointer 58' due to variations in the capacitance to be determined $C_X$. The length of pointer 58' (which corresponds to the amplitude of the overall current) is within the same order of magnitude as the length of the pointer of the possible variations 60' (which corresponds to the possible variations of the amplitude of the overall current). The compensation capacitor 38 is selected such that the sum of the capacitive load $\omega \cdot C_{COMP}$ and the maximum value of the capacitive load $\omega \cdot (C_{CHOKE} + C_X)$ amounts to at least 50% preferably to at least 75%, more preferably to at least 90% and most preferably to at least 95%, of the inductive load $1/(\omega \cdot L_{CHOKE})$. It follows that the ratio [useful, variable, part of the signal]/[constant part of the signal] is increased, leading to a better measurement resolution than without the compensation capacitor 38.

Figure 5:
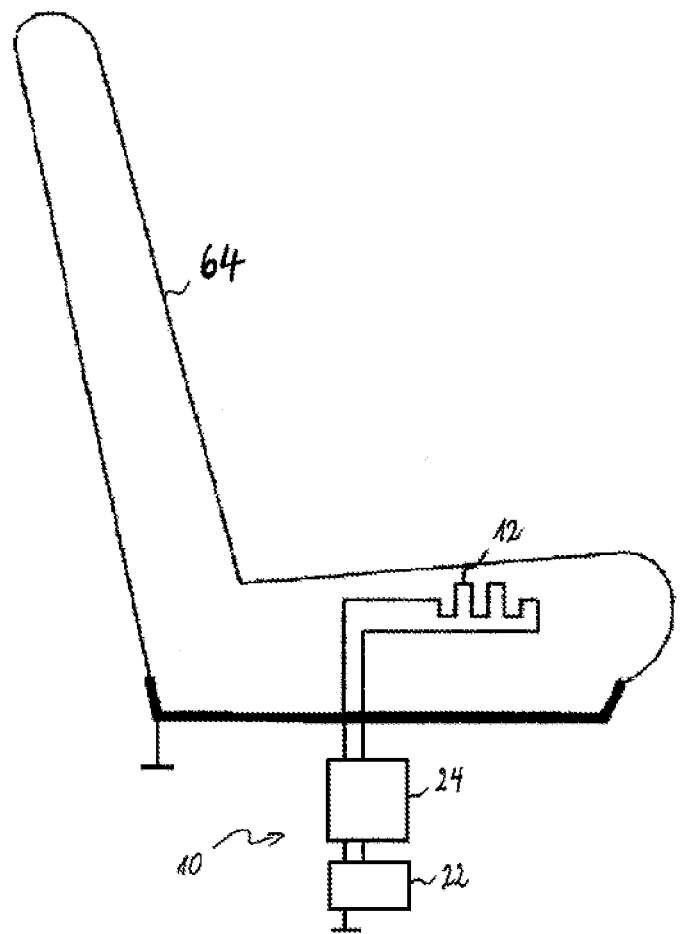
FIG. 5 is a schematic representation of a vehicle seat equipped with a combined heating and capacitive sensing system.

FIG. 5 is a schematic representation of a vehicle seat 54 equipped with a combined heating and capacitive sensing system 10 in accordance with the invention, e.g. as illustrated in FIG. 1.

Figure 6:
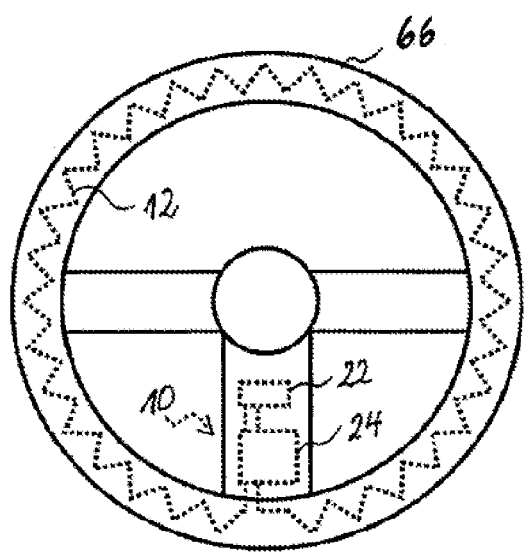
FIG. 6 is a schematic representation of a steering wheel equipped with a combined heating and capacitive sensing system.

FIG. 6 is a schematic representation of a steering wheel 56 equipped with a combined heating and capacitive sensing system 10 in accordance with the invention, e.g. as illustrated in FIG. 1.

In FIG. 1, frame 24 designates those components of a capacitive sensing system in accordance with the invention that can be arranged together in a module, which may be connected between an existing heating element and its heating current supply.

While specific embodiments have been described in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

What is claimed is:

1. Capacitive sensing system for being connected to a heating element producing heat upon electrical current being caused to flow across the heating element, said capacitive sensing system comprising
    a capacitive detector connectable to said heating element, configured for driving an alternating current into said heating element and for producing an output depending on a capacitive load acting on said alternating current between said heating element and a reference node, said capacitive load being variable in a range between a minimum value and a maximum value depending on an object to be sensed;
    a common mode choke for connecting said heating element with a heating current supply, said common mode choke representing an inductive load in parallel of said capacitive load, said capacitive load and said inductive load contributing together to a complex impedance;
    wherein, within said complex impedance, said inductive load dominates said capacitive load, and
    wherein said capacitive sensing system comprises at least one compensation capacitor arranged in parallel of said common mode choke, said compensation capacitor representing an additional capacitive load also contributing to said complex impedance, said compensation capacitor dimensioned such that the sum of said additional capacitive load and said maximum value amounts to at least 50% of said inductive load.

2. Capacitive sensing system as claimed in claim 1, wherein said sum of said additional capacitive load and said maximum value amounts to at least 75% of said inductive load.

3. Capacitive sensing system as claimed in claim 1, wherein said sum of said additional capacitive load and said maximum value amounts to at least 90% of said inductive load.

4. Capacitive sensing system as claimed in claim 1, wherein said sum of said additional capacitive load and said maximum value amounts to at least 95% of said inductive load.

5. Capacitive sensing system as claimed in claim 1, wherein said capacitive detector is configured for driving alternating currents at plural frequencies into said heating element, said capacitive detector activating or deactivating said compensation capacitor depending on the frequency of the alternating current.

6. Capacitive sensing system as claimed in claim 1, wherein said capacitive detector is configured for driving alternating currents at plural frequencies into said heating element, said inductive load dominating the capacitive load to different extents at the different frequencies, and wherein said capacitive sensing system comprises at least one further compensation capacitor for counteracting the different extents of domination at the different frequencies.

7. Combined heating and capacitive sensing system, comprising
- a heating element producing heat upon electrical current being caused to flow across the heating element,
- a capacitive detector connected to said heating element, configured for driving an alternating current into said heating element and for producing an output depending on a capacitive load on said alternating current between said heating element and a reference node, said capacitive load being variable in a range between a minimum value and a maximum value depending on an object to be sensed;
- a common mode choke for connecting said heating element with a heating current supply, said common mode choke representing an inductive load in parallel of said capacitive load, said capacitive load and said inductive load contributing together to a complex impedance;
- wherein, within said complex impedance, said inductive load dominates said capacitive load, and
- wherein said combined heating and capacitive sensing system comprises at least one compensation capacitor arranged in parallel of said common mode choke, said compensation capacitor representing an additional capacitive load also contributing to said complex impedance, said compensation capacitor dimensioned such that the sum of said additional capacitive load and said maximum value amounts to at least 50% of said inductive load.

8. Combined heating and capacitive sensing system as claimed in claim 7, wherein said sum of said additional capacitive load and said maximum value amounts to at least 75% of said inductive load.

9. Combined heating and capacitive sensing system as claimed in claim 7, wherein said sum of said additional capacitive load and said maximum value amounts to at least 90% of said inductive load.

10. Combined heating and capacitive sensing system as claimed in claim 7, wherein said sum of said additional capacitive load and said maximum value amounts to at least 95% of said inductive load.

11. Combined heating and capacitive sensing system as claimed in claim 7, wherein said capacitive detector is configured for driving alternating currents at plural frequencies into said heating element, said capacitive detector activating or deactivating said compensation capacitor depending on the frequency of the alternating current.

12. Combined heating and capacitive sensing system as claimed in claim 7, wherein said capacitive detector is configured for driving alternating currents at plural frequencies into said heating element, said inductive load dominating the capacitive load to different extents at the different frequencies, and wherein said capacitive sensing system comprises at least one further compensation capacitor for counteracting the different extents of domination at the different frequencies.

13. Vehicle seat equipped with a combined heating and capacitive sensing system as claimed in claim 7.

14. Steering wheel comprising a combined heating and capacitive sensing system as claimed in claim 7.

* * * * *